United States Patent [19]
Crutcher

[11] Patent Number: 5,506,549
[45] Date of Patent: Apr. 9, 1996

[54] CABLE EQUALIZER

[75] Inventor: William L. Crutcher, Richardson, Tex.

[73] Assignee: DSC Communications Corporation, Plano, Tex.

[21] Appl. No.: 338,666

[22] Filed: Nov. 14, 1994

[51] Int. Cl.$^6$ ............................. H03H 7/03; H04B 3/14
[52] U.S. Cl. ...................... 333/18; 333/28 R; 455/52.3
[58] Field of Search .................... 333/18, 28 R, 333/81 R, 81 A, 100, 117, 118; 375/229; 455/52.1–52.3

[56] References Cited

U.S. PATENT DOCUMENTS

| | | | |
|---|---|---|---|
| 3,323,080 | 5/1967 | Schwelb et al. | 333/81 R X |
| 3,551,854 | 12/1970 | Endo et al. | 333/28 R |
| 3,578,914 | 5/1971 | Simonelli | 333/18 X |
| 3,728,649 | 4/1973 | Waldhauer | 333/18 |
| 3,812,436 | 5/1974 | Fudemoto et al. | 333/18 |
| 3,868,604 | 2/1975 | Tongue | 333/81 R X |
| 4,028,644 | 6/1977 | Niiro | 333/16 |
| 4,151,490 | 4/1979 | Bazin | 333/16 |
| 4,258,340 | 3/1981 | Ryu | 333/28 R X |
| 4,378,535 | 3/1983 | Chiu et al. | 333/18 |
| 4,415,872 | 11/1983 | Karabinis | 333/28 R X |
| 4,870,658 | 9/1989 | Suzuki et al. | 375/12 |
| 5,062,148 | 10/1991 | Edwards | 455/52 |
| 5,311,155 | 5/1994 | Blodgett | 333/28 R |
| 5,355,519 | 10/1994 | Hasegawa | 455/52.3 |

FOREIGN PATENT DOCUMENTS

| | | | |
|---|---|---|---|
| 274526 | 11/1989 | Japan | 455/52.3 |

*Primary Examiner*—Paul Gensler
*Attorney, Agent, or Firm*—Baker & Botts

[57] ABSTRACT

A cable equalizer (10) receives signals transmitted over a coaxial cable (12) at a multi-path simulator (14). The multi-path simulator (14) includes a splitter (16) that places the signal along a first path (26) and a second path (28), wherein the signal on the first path (26) is 180° out of phase with the signal along the second path (28). The signal along the first path (26) propagates to a combiner circuit (18). The signal along the second path (28) propagates through a delay circuit (20) having a delay value of τ that determines the notch spacing of the equalized signal. The signal along second path 28 propagates from delay circuit 20 to a variable attenuator circuit (22) that determines the notch depth for the equalized signal. The combiner (18) receives the signal along the first path (26) and the second path (28) and generates an equalized signal at the output of the multi-path simulator (14). The equalized signal may be further processed by a variable attenuator circuit (24) in order to generate the final equalized signal output.

14 Claims, 1 Drawing Sheet

CABLE EQUALIZER

TECHNICAL FIELD OF THE INVENTION

The present invention relates in general to high speed electrical signal transport and more particularly to a cable equalizer.

BACKGROUND OF THE INVENTION

In processing signals transported by coaxial cable systems, it is often found that the signal is attenuated by the cable to such an extent that a correction is required to compensate the signal for the cable attenuation. Cable losses may be generally characterized as resistive losses and or dielectric losses. Losses attributed to the resistance value of the cable cause a relatively linear attenuation over the frequency range of the signal being transmitted and is generally not of significant concern. The cable losses attributed to the skin effect of the cable is of major concern as its effect is to attenuate the higher frequencies of the signal being transmitted. The problem of cable attenuation of the signal is further increased as the length of the cables are varied.

Since a fixed cable compensation will not satisfy the typical cable installation, it is common practice to view the signal being received on a waveform monitor and manually switching cable compensation circuits, which may be in the form of high frequency emphasis networks, to compensate for the high frequency losses occurring in the cable. However, as increasingly higher frequency signals are being transported on cable systems, conventional cable equalizing techniques do not provide the proper signal compensation required for telecommunication networks. Therefore, it is desirable to have a cable equalizer that can compensate for attenuation in higher frequency signal transmission.

From the foregoing, it may be appreciated that a need has arisen for a cable equalizer that can flatten out the response inserted into high frequency signals by cable attenuation.

SUMMARY OF THE INVENTION

In accordance with the present invention, a cable equalizer is provided that substantially eliminates or reduces disadvantages and problems associated with conventional cable attenuation compensators.

According to an embodiment of the present invention, there is provided a cable equalizer that includes a multi-path simulator operable to receive an attenuating signal from a coaxial cable. The multi-path simulator is operable to generate an equalized signal from the attenuated signal by flattening a response of the attenuated signal.

The present invention provides various technical advantages over conventional cable attenuation compensators. For example, one technical advantage is in the use of a multi-path simulator in a cable equalizer. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
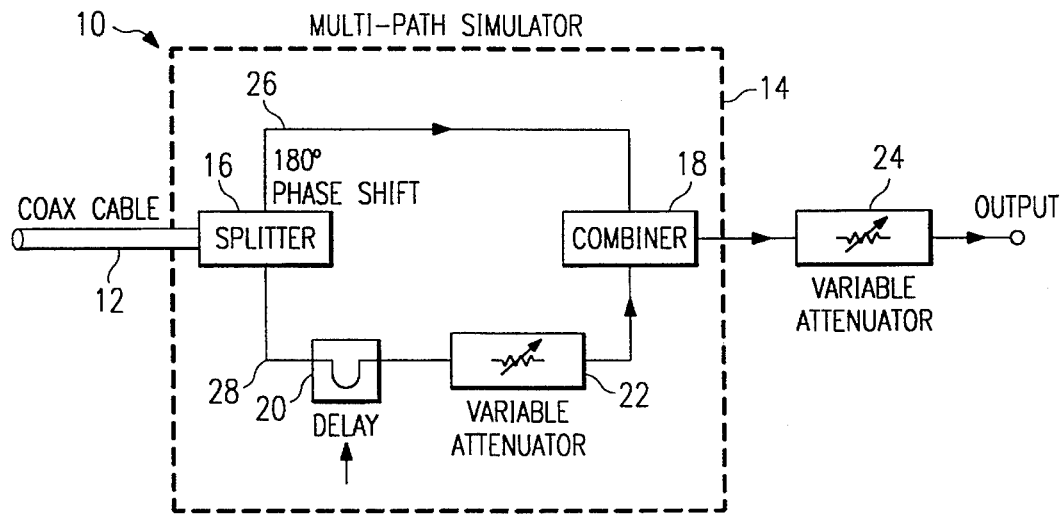
FIG. 1 illustrates a simplified block diagram of a cable equalizer.

FIG. 1 is a simplified block diagram of a cable equalizer 10. Cable equalizer 10 receives signals from a coaxial cable 12. Signals from coaxial cable 12 enter a multi-path simulator 14 of cable equalizer 10. Multi-path simulator 14 includes a splitter circuit 16, a combiner circuit 18, a delay circuit 20, and a first variable attenuator circuit 22. An output of multi-path simulator 14 may proceed through an optional second variable attenuator 24 before providing an equalized signal at the output of cable equalizer 10.

In operation, splitter 16 of multi-path simulator 14 receives signals from coaxial cable 12 and directs attenuated signals along a first path 26 and a second path 28. The attenuated signal along first path 26 is 180° out of phase with the attenuated signal along second path 28. The attenuated signal along first path 26 proceeds directly to combiner 18. The attenuated signal along second path 28 passes through a delay circuit 20 having a delay value of τ. After proceeding through delay circuit 20, the attenuated signal passes through first variable attenuator 22 before entering combiner 18. Combiner 18 combines the attenuated signal from first path 26 with the attenuated signal from second path 28 to generate an equalized signal at the output of multi-path simulator 14. Further processing may be performed on the equalized signal by passing the equalized signal through second variable attenuator circuit 24. The output of second variable attenuator circuit 24 becomes the output for cable equalizer 10.

Figure 2:
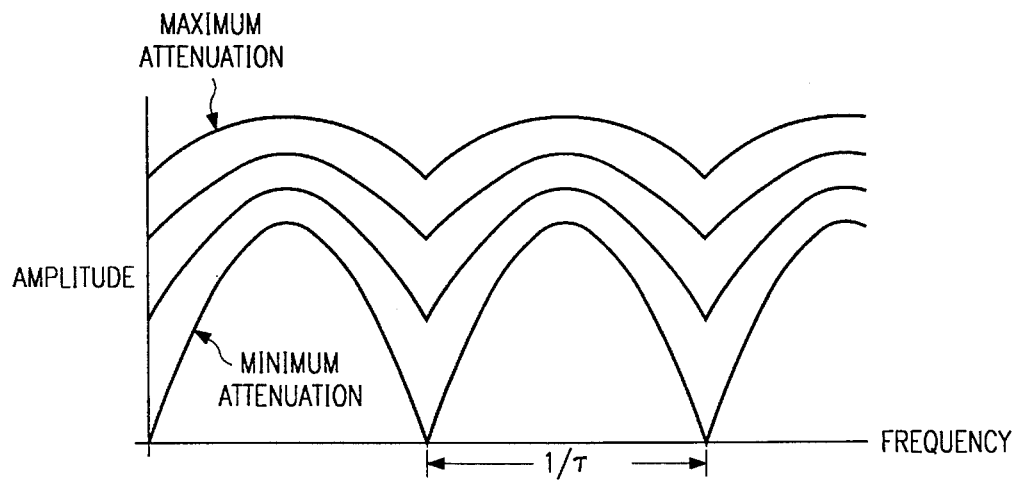
FIG. 2 illustrates a graph depicting the output of the cable equalizer for various attenuations.

FIG. 2 shows a graph of various equalized signals at the output of multi-path simulator 14. The attenuated signal passes through delay circuit 20 that determines the notch spacing for the equalized signal. The notch spacing is equal to the inverse value of τ, the delay value of delay circuit 20. The value of τ is chosen such that the attenuated signal at the desired data rate can be equalized. Once delayed, the attenuated signal becomes adjusted by first variable attenuator circuit 22. First variable attenuator circuit 22 establishes the depth of the notch for the equalized signal. The graph of FIG. 2 shows various equalized signals having different attenuation values within first variable attenuator circuit 22.

As the attenuation value within first variable attenuator circuit 22 increases, the notch depth of the equalized signal decreases. The change in slope of the notch depth by first variable attenuator circuit 22 compensates for the slope of the attenuation induced by coaxial cable 12. The slope of the attenuation induced by coaxial cable 12 is in the opposite direction of the change in slope of the notch depth. Multi-path simulator 14 generates an equalized signal by flattening out the response of the attenuated signal to a usable bandwidth. The 180° phase shift of the attenuated signal on first path 26 ensures that the notch depth is at a DC level.

Figure 3:
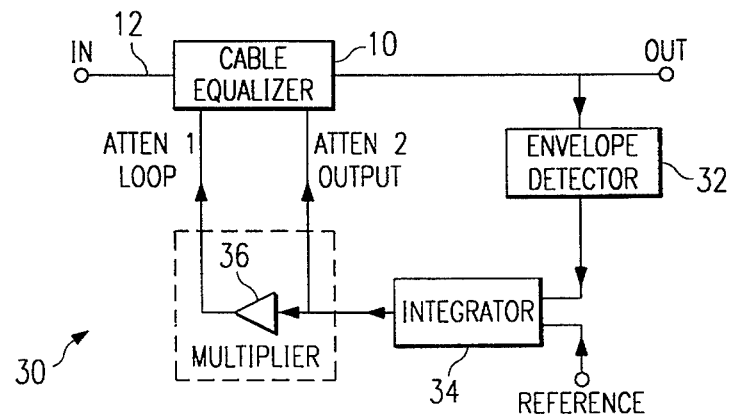
FIG. 3 illustrates a simplified block diagram of a control system for the cable equalizer.

FIG. 3 is a simplified block diagram of a control system 30 for cable equalizer 10. The output of second variable attenuator circuit 24 of cable equalizer 10 is provided to an envelope detector 32. Envelope detector 32 generates a dc level signal that is proportional to the energy of the output of cable equalizer 10. The dc level signal from envelope detector 32 is applied to an integrator 34. Integrator 34 integrates the envelope of the dc level signal relative to a reference set point voltage. Integrator 34 generates a control signal to adjust the attenuation of second variable attenuator circuit 24. The control signal from integrator 34 also adjusts the attenuation of first variable attenuator circuit 22 after passing through multiplier 36. Multiplier 36 adjusts the control signal from integrator 34 according to a rate differential between first variable attenuator circuit 22 and second variable attenuator circuit 24.

Control system 30 provides automatic equalization in the frequency response of coaxial cable 12. The combined frequency response of coaxial cable 12 and cable equalizer 10 is kept flat regardless of the length of coaxial cable 12. The reference set point voltage for integrator 34 is adjusted such that a flat frequency response is maintained through coaxial cable 12 and cable equalizer 10. First and second variable attenuator circuits 22 and 24 ensure that less attenuation is inserted into the output with increasing lengths of coaxial cable.

In summary, a multi-path simulator is used in a cable equalizer circuit in order to generate an equalized signal and overcome the attenuation induced by transmission over a coaxial cable. The multi-path simulator allows for attenuation adjustments in order to generate an equalized signal according to the length of the coaxial cable.

Thus, it is apparent that there has been provided, in accordance with the present invention, a cable equalizer that satisfies the advantages set forth above. Although the preferred embodiment has been described in detail, it should be understood that various changes, substitutions, and alterations can be made herein. For example, though only two paths have been shown in the multi-path simulator, the multi-path simulator may have any number of different paths for equalizing the signal attenuated by the coaxial cable. Other examples are readily ascertainable by one skilled in the art without departing from the spirit and scope of the present invention as defined by the following claims.

What is claimed is:

1. A cable equalizer, comprising:
   a multi-path simulator for receiving a coaxial cable input, said multi-path simulator generating an equalized signal from said coaxial cable input by reducing an amplitude of a frequency response of said coaxial cable input wherein said multi-path simulator includes a splitter circuit for splitting said coaxial cable input onto a first path having a first path signal and a second path having a second path signal, said first path signal leaving said splitter circuit 180 degrees out of phase with said second path signal.

2. The cable equalizer of claim 1, wherein said second path includes a delay circuit having a delay value corresponding to a data rate of said equalized signal.

3. The cable equalizer of claim 2, wherein said second path includes a variable attenuator circuit for adjusting said response of said coaxial cable input in order to compensate for attenuation on said coaxial cable.

4. The cable equalizer of claim 3, wherein said coaxial cable input has a notch depth and width determined by said variable attenuator circuit and said delay value, respectively.

5. The cable equalizer of claim 3, wherein said multi-path simulator includes a combiner circuit for receiving said first and second path signals, said combiner circuit generating said equalized signal in response to said first and second path signals.

6. The cable equalizer of claim 1, further comprising:
   a variable attenuator for receiving said equalized signal from said multi-path simulator, said variable attenuator adjusting a response of said equalized signal.

7. A cable equalizer system, comprising:
   a multi-path simulator for receiving a coaxial cable input, said multi-path simulator generating an equalized signal from said coaxial cable input by reducing an amplitude of frequency response of said coaxial cable input;
   a first variable attenuator circuit for receiving said equalized signal from said multi-path simulator, said first variable attenuator circuit adjusting a response of said equalized signal in order to generate an equalized output;
   an envelope detector for receiving said equalized output from said first variable attenuator circuit, said envelope detector generating an energy signal proportional to an energy level of said equalized output; and
   an integrator for receiving said energy signal from said envelope detector, said integrator generating a control signal in response to said energy signal, said control signal adjusting an attenuation of said first variable attenuator circuit in order to maintain a flat frequency response of said equalized output.

8. The cable equalizer system of claim 7, wherein said multi-path simulator includes a second variable attenuator circuit, said control signal adjusting an attenuation of said second variable attenuator circuit in order to maintain a flat frequency response of said equalized output.

9. The cable equalizer system of claim 7, further comprising a multiplier for multiplying said control signal by a constant value prior to said control signal adjusting said attenuation of said second variable attenuator circuit.

10. The cable equalizer system of claim 7, wherein said flat frequency response is maintained regardless of a length of said coaxial cable.

11. The cable equalizer system of claim 7, wherein said integrator integrates said energy signal relative to a reference set point voltage, said reference set point voltage being selectively adjusted to maintain said flat frequency response.

12. The cable equalizer of claim 7, wherein said multi-path simulator includes:
   a splitter circuit for splitting said coaxial cable input onto a first path having a first path signal and a second path having a second path signal, said first path signal leaving said splitter circuit 180 degrees out of phase with said second path signal, said second path including a delay circuit having a delay value corresponding to a data rate of said equalized signal, said second path including a second variable attenuator circuit for adjusting said response of said second path signal in order to compensate for attenuation on said coaxial cable, said control signal adjusting an attenuation of said second variable attenuator circuit;
   a combiner circuit for receiving said first and second path signals, said combiner circuit generating said equalized signal in response to said first and second path signals.

13. The cable equalizer system of claim 12, wherein said coaxial cable input has a notch depth and width determined by said variable attenuator circuit and said delay value, respectively.

14. A cable equalizer generating an equalized signal from a coaxial cable input, comprising:
   a splitter circuit for receiving said coaxial cable input, said splitter circuit splitting said coaxial cable input onto a first path and a second path, said coaxial cable input on said first path leaving said splitter circuit 180 degrees out of phase with said coaxial cable input on said second path;

a delay circuit on said second path having a delay value corresponding to a data rate of said equalized signal;

a variable attenuator circuit on said second path for adjusting said response of said coaxial cable input in order to compensate for attenuation on said coaxial cable;

a combiner circuit for receiving said coaxial cable input on said first path from said splitter circuit and said coaxial cable input on said second path from said variable attenuator circuit, said combiner circuit generating said equalized signal in response to said coaxial cable input along said first and second paths.

* * * * *